US012448335B2

(12) United States Patent
Ivanov et al.

(10) Patent No.: US 12,448,335 B2
(45) Date of Patent: Oct. 21, 2025

(54) MAGNESIUM OXIDE SPUTTERING TARGET AND METHOD OF MAKING SAME

(71) Applicant: TOSOH SMD, INC., Grove City, OH (US)

(72) Inventors: Eugene Y. Ivanov, Grove City, OH (US); Christopher M. Jaworski, Grove City, OH (US)

(73) Assignee: TOSOH SMD, INC., Grove City, OH (US)

( * ) Notice: Subject to any disclaimer, the term of this patent is extended or adjusted under 35 U.S.C. 154(b) by 0 days.

(21) Appl. No.: 16/310,864

(22) PCT Filed: Jul. 5, 2017

(86) PCT No.: PCT/US2017/040684
§ 371 (c)(1),
(2) Date: Dec. 18, 2018

(87) PCT Pub. No.: WO2018/013387
PCT Pub. Date: Jan. 18, 2018

(65) Prior Publication Data
US 2020/0010368 A1    Jan. 9, 2020

Related U.S. Application Data

(60) Provisional application No. 62/361,562, filed on Jul. 13, 2016.

(51) Int. Cl.
| | | |
|---|---|---|
| *C04B 35/053* | (2006.01) | |
| *C04B 35/626* | (2006.01) | |
| *C04B 35/645* | (2006.01) | |
| *C23C 14/08* | (2006.01) | |
| *C23C 14/34* | (2006.01) | |

(52) U.S. Cl.
CPC ........ *C04B 35/053* (2013.01); *C04B 35/6261* (2013.01); *C04B 35/645* (2013.01); *C23C 14/081* (2013.01); *C23C 14/34* (2013.01); *C23C 14/3414* (2013.01); *C04B 2235/5409* (2013.01); *C04B 2235/5445* (2013.01); *C04B 2235/72* (2013.01); *C04B 2235/77* (2013.01); *C04B 2235/786* (2013.01); *C04B 2235/9653* (2013.01)

(58) Field of Classification Search
CPC . C04B 35/053; C04B 35/6261; C04B 35/645; C04B 2235/5409; C04B 2235/5445; C04B 2235/72; C04B 2235/77; C04B 2235/775; C04B 2235/786; C04B 2235/9653; C23C 14/34; C23C 14/3414; C23C 14/081
USPC ........................................ 204/298.12, 298.13
See application file for complete search history.

(56) References Cited

U.S. PATENT DOCUMENTS

| | | | |
|---|---|---|---|
| 8,454,933 B2 | 6/2013 | Nagano | |
| 2008/0199686 A1 | 8/2008 | Chu et al. | |
| 2014/0284212 A1 | 9/2014 | Hisano | |
| 2014/0318956 A1 | 10/2014 | Okamoto | |
| 2014/0360345 A1* | 12/2014 | Schnetter | C04B 35/505 |
| | | | 423/385 |

FOREIGN PATENT DOCUMENTS

| | | | |
|---|---|---|---|
| JP | H10158826 A | | 6/1998 |
| JP | 2006-002208 | * | 1/2006 |
| JP | 2006002208 A | | 1/2006 |
| JP | 2008189493 A | | 8/2008 |
| JP | 2009-173502 | * | 8/2009 |
| KR | 1020070115099 A | | 12/2007 |

OTHER PUBLICATIONS

Machine Translation JP 2006-002208. (Year: 2006).*
Itatani et al. "Thermal and optical properties of transparent magnesium oxide ceramics fabricated by post hot-isostatic pressing", Journal of the European Ceramic Society 26 (2006) 639-645 (Year: 2006).*
Machine Translation JP 2009-173502 (Year: 2009).*
Dobrzanki et al. "Fabrication Technologies of the Sintered Materials Including Materials for Medical and Dental Application", Mar. 2017 (Year: 2017).*
Tech Team · Kintek Solution, "What is the difference between hot pressing and isostatic pressing? Key Methods and Applications Explained", No Date. (Year: No. Date).*
International Search Report and Written Opinion received in related International Application No. PCT/US2017/040684, dated Oct. 18, 2017, 14 pages.

* cited by examiner

*Primary Examiner* — Rodney G McDonald
(74) *Attorney, Agent, or Firm* — McDonald Hopkins LLC

(57) ABSTRACT

A sintered compact magnesium oxide target for sputtering having a purity of 99.99 wt % or higher, a density of 3.58 g/cm³ or higher, and a transparency 10% or more. A sintered compact magnesium oxide target for sputtering having a purity of 99.99 wt % or higher, a density of 3.58 g/cm³ or higher, and an average crystal grain size of 50 μm or more.

12 Claims, No Drawings

MAGNESIUM OXIDE SPUTTERING TARGET AND METHOD OF MAKING SAME

CROSS-REFERENCE TO RELATED APPLICATIONS

This application claims the priority benefit of PCT Appl. Serial No. PCT/US2017/040684, filed Jul. 5, 2017, which claims the priority benefit of U.S. Provisional Patent Application Ser. No. 62/361,562 filed Jul. 13, 2016.

FIELD OF INVENTION

The present invention pertains to a magnesium oxide target for use in forming a magnesium oxide layer for tunneling magnetoresistance (TMR) elements and other electronic devices, and to a method of producing such a magnesium oxide target. The present invention particularly relates to a sintered compact magnesium oxide target for sputtering of high purity and high density and which is translucent, and to the method of producing such a sintered compact magnesium oxide target for sputtering.

BACKGROUND OF THE INVENTION

While a magnesium oxide sintered compact sputtering target is produced by hot-pressing a raw material powder, there is a problem in that these targets are white in color and include a density that is not uniform. Conventionally, no particular attention has been given to this problem. However, in recent years, it has become necessary to investigate and resolve this problem in order to improve the deposition quality.

DESCRIPTION OF THE RELATED ART

U.S. Pat. No. 8,454,933 to Naguno et al., discloses a MgO sintered body which is useful as a sputter target. The targets are produced from MgO powders having a particle size of 1 µm or less under a uniaxial pressure. However, these sintered powders are subjected to a heat treatment under an oxygen containing atmosphere at a temperature of 1273K for 1 minute or more, and include an average crystal grain size is preferably 30 µm or less.

U.S. Patent Publication 2014/0284212 A1 to Misano discloses a sintered compact magnesium oxide target for sputtering having a whiteness of 60% or less.

U.S. Patent Publication 2014/0318956 to Okamoto et al. discloses a sputtering target made of a magnesium oxide sintered body which has a purity of not less than 99.99% by mass %, a relative density of more than 98%, and an average grain size of not more than between 5-8 µm. A method for producing a sputtering target made of a magnesium oxide sintered body having a purity of not less than 99.99% by mass % is disclosed comprising: performing a hot-press sintering at 1250 to 1350° C. to obtain the sintered body; and thereafter performing an annealing treatment at 1250 to 1400° C.

Japanese Patent Application JPH 10158826A to Takenouchi discloses a MgO sputtering target having a high purity and density. High purity MgO powder is added with 10 to 60 wt % electromelted MgO powder, 1 to 5 wt % MgO fine powder with the average grain size of 100 nm and a binder, and mixing is executed. This mixture is compacted and degreased, is thereafter subjected to primary sintering at 1250 to 1350° C. and is next subjected to secondary sintering at 1500° C. By the blending and two-step sintering, a high purity and high density MgO sintered body can be produced. By the blending of the electromelted MgO powder, MgO coating good in crystallinity can be formed.

In recent years, the use of a magnesium oxide film in tunneling magnetoresistance (TMR) elements and other electronic devices is being considered, but a magnesium oxide target having a higher purity and a higher density is being demanded in order to uniformly deposit a magnesium oxide film and minimize defect adders during sputtering. Nevertheless, since expectations for higher purification and densification are extremely high, it is conventionally difficult to produce a magnesium oxide target capable of meeting the foregoing demands. Thus, an object of this invention is to provide a target capable of realizing the above, and a method for producing such a target.

SUMMARY OF THE INVENTION

In accordance with one aspect of the present invention, a sintered compact magnesium oxide target for sputtering is disclosed. The sintered compact magnesium oxide target comprises a purity of 99.99 wt % or higher, a density of 3.58 g/cm$^3$ or higher, and a transparency 10% or more. In some embodiments, the target further includes raw material of pure MgO powder, wherein the MgO powder includes a particle size of less than $10^{-6}$ m and specific surface area of less than 15 $10^3$ m$^2$/kg. In other embodiments, the transparence is 10% or higher. In other embodiments, the variation in the transparence is within 1%.

In another exemplary embodiment, a sintered compact magnesium oxide target for sputtering comprising a purity of 99.99 wt % or higher, a density of 3.58 g/cm$^3$ or higher, and an average crystal grain size of 50 µm or more, is disclosed. In other such embodiments, the target further includes raw material of pure MgO powder, wherein the MgO power includes a particle size of less than $10^{-6}$ m and a specific surface area less than 15 $10^3$ m$^2$/kg. In other such embodiments, the transparence is 10% or higher. In other such embodiments, the variation in the transparence is within 1%.

In yet another embodiment, a method for producing a sintered compact magnesium oxide target for sputtering is disclosed. The method comprises obtaining a raw material by the milling of magnesium oxide (MgO), wherein the raw material include powders comprising magnesium oxide (MgO) having a purity of 99.99 wt % or higher and an average grain size of 0.5 µm or less, and hot pressing the milled powder at a temperature of 1700° C. or less and an applied pressure of at least 200 kgf/cm$^2$ or more, to obtain a sintered compact magnesium oxide target.

In such embodiments, the method further comprises a target comprising a purity of 99.99 wt % or higher, and a density of 3.58 g/cm$^3$ or higher. In other such embodiments, the method comprises an applied pressure is 300 kgf/cm$^2$ or more.

In yet another embodiment of the present invention, a method for producing a sintered compact magnesium oxide target for sputtering is disclosed. The method comprising obtaining a raw material by the milling of magnesium oxide (MgO), wherein the raw material include powders comprising magnesium oxide (MgO) having a purity of 99.99 wt % or higher and an average grain size of 0.5 µm or less, and hot pressing the milled powder at a temperature of 1700° C. or less and at an applied pressure of at least 200 kgf/cm$^2$ or more, to obtain a sintered compact magnesium oxide target, wherein the sintered compact magnesium oxide target includes a purity of 99.99 wt % or higher, a density of 3.58 g/cm³ or higher, a transparency 10% or more, and an average crystal grain size of 50 μm or more.

DETAILED DESCRIPTION

The present invention provides a sintered compact magnesium oxide target for sputtering. The sintered compact magnesium oxide target for sputtering includes a purity of at least 99.99 wt % or higher. The sintered compact magnesium oxide target of the present invention further includes a density of 3.58 g/cm³ or higher, and a transparency 10% or more.

In some embodiments, the sintered compact magnesium oxide target includes a density of 3.58 g/cm³ or higher. In other embodiments, the sintered compact magnesium oxide target for sputtering includes a density of at least 3.5805 g/cm³ or higher, in other embodiments, at least 3.581 g/cm³ or higher, and in other embodiments, at least 3.5815 g/cm³ or higher.

In some embodiments, the sintered compact magnesium oxide target for sputtering includes a transparence of 10% or more. The term transparence or transparency should also be understood to mean the quality of allowing light to pass through a material. In some embodiments, the sintered compact magnesium oxide target for sputtering includes a transparence of at least 15% or more, in some embodiments, a transparence of at least 20% or more, and in other embodiments, at least 30% or more.

In some embodiments, the variation in the transparence is within 1%. In other embodiments, the variation in the transparence is within 0.75%, and in other embodiments, within 0.50%.

In some embodiments, the sintered compact magnesium oxide target for sputtering further includes raw material of pure MgO powder. In some embodiments, the MgO powder includes a particle size of less than $10^{-6}$ m and specific surface area of less than 15 $10^3$ m²/kg.

In some embodiments, the present invention exhibits a magnesium oxide target having a higher purity and a higher density. This higher purity and higher density can be obtained with inexpensive processing conditions in comparison to conventional methods based on the selection of raw material powders and the optimal setting of sintering conditions.

The sintered compact magnesium oxide target of the present invention exhibits larger average crystal grain size. In some embodiments, the larger average grain size results in low particle emission from the target. By having a larger average crystal grain size, less particles are located or exposed on the silicon wafer, as opposed to those targets which provide a smaller average crystal grain size. In some embodiments, the larger average crystal grain size results in better sputtering performance.

In some embodiments, the sintered compact magnesium oxide target comprises an average crystal grain size of 50 μm or more. In other embodiments, the sintered compact magnesium oxide target comprises an average crystal grain size of 60 μm or more, in other embodiments, an average crystal grain size of 70 μm or more, and in other embodiments, an average crystal grain size of 80 μm or more.

The present invention further provides a method for producing a sintered compact magnesium oxide target for sputtering. The method comprises obtaining a raw material by the milling of magnesium oxide (MgO), and hot pressing the milled powder to obtain a sintered compact magnesium oxide target.

In some embodiments, the step of obtaining a raw material by the milling includes magnesium oxide (MgO) comprising a purity of 99.99 wt % or higher and an average grain size of 0.5 μm or less.

In some embodiments, the step of hot pressing the milled powder occurs at a temperature of 1700° C. or less. In some embodiments, the step of hot pressing the milled powder occurs at a temperature range between 1400-1700° C., in other embodiments, a temperature range between 1500-1700° C., and in other embodiments, a temperature range between 1600-1700° C.

In some embodiments, the step of hot pressing the milled powder occurs at an applied pressure of at least 200 kgf/cm² or more. In other embodiments, the step of hot pressing the milled powder occurs at an applied pressure of at least 300 kgf/cm² or more.

With respect to the occurrence of color shading, in some embodiments, the method of the present invention produces a sintered compact magnesium oxide target for sputtering which includes a uniformly translucent oxide target. In some embodiments, the translucent oxide target of the present invention is free of or substantially free of color shading. In other embodiments, the translucent oxide target of the present invention comprises a moderate oxygen defect.

In some embodiments, the sintered compact magnesium oxide target for sputtering and methods disclosed herein do not require the addition of additives. Such additives include, for example, $MgCO_3$ or $Mg(OH)_2$. In some embodiments, the sintered compact magnesium oxide target for sputtering and methods disclosed herein do not require any electromelted powders.

In some embodiments, the sintered compact magnesium oxide target for sputtering and methods disclosed herein do not require any additional sintering steps after hot pressing. The present invention provides for good particle performance without the additional sintering steps. One benefit that can be realized from the elimination of additional sintering steps is that the present invention allows for a reduction in production costs.

In a specific embodiment, a method for producing a sintered compact magnesium oxide target for sputtering is provided. The method comprises obtaining a raw material by the milling of magnesium oxide (MgO), wherein the raw material includes powders comprising magnesium oxide (MgO) having a purity of 99.99 wt % or higher and an average grain size of 0.5 μm or less, and hot pressing the milled powder at a temperature of 1700° C. or less, and at an applied pressure of at least 200 kgf/cm² or more, to obtain a sintered compact magnesium oxide target. In such embodiments, the sintered compact magnesium oxide target includes a purity of 99.99 wt % or higher, a density of 3.58 g/cm³ or higher, a transparency of 10% or more, and an average crystal grain size of 50 μm or more.

EXAMPLES

The following examples are included as being illustrative of the invention and shall not be construed as limiting the scope thereof.

Example 1

Magnesium oxide powder of specific surface area of 8 $10^3$ m²/kg and mean particle size of 0.5 $10^{-6}$ m and purity of 99.99% was hot pressed at a temperature of 1500° C. at an applied pressure of 300 kgf/cm². Thus a magnesium oxide sputtering target produced of this invention was sintered to a density of 3.581 g/cm$^3$ and a transparency of 16% and a grain size of 70 μm. For comparison, a magnesium oxide sputtering target of purity 99.99% and density 3.576 g/cm$^3$ and transparency in the center of 0.8% and grain size of 15 μm was produced. Both the inventive sintered body and the comparative sintered body were sputtered under the same conditions. The performance of the two is shown in Table 1. We see that the particle performance of the exemplary magnesium oxide target is far superior to the comparative target. It is desirable to have lower particles on the silicon wafer to increase yield.

TABLE 1

|  | Density (g/cm$^3$) | Average crystal grain size | Transparency | Particle Performance |
|---|---|---|---|---|
| Inventive Sintered Body 1 | 3.581 | 70 μm | 16% | 150 |
| Comparative Sintered Body 1 | 3.576 | 15 μm | 0.8% | 300 |

While the present invention has been described with respect to particular examples, it is apparent that numerous other forms and modifications of the invention will be obvious to those skilled in the art. The appended claims and this invention should be construed to cover all such obvious forms and modifications.

The invention claimed is:

1. A method for producing a sintered compact magnesium oxide target for sputtering, the method comprising:
   obtaining a raw material by the milling of magnesium oxide (MgO), wherein said raw material include powders comprising magnesium oxide (MgO) having a purity of 99.99 wt % or higher and an average grain size of 0.5 μm or less, said raw material being devoid of MgCO$_3$; and
   hot pressing said milled powder at a temperature of 1700° C. or less and an applied pressure of at least 200 kgf/cm$^2$ or more in a uniaxial direction, to obtain a sintered compact magnesium oxide target, thereby said sintered compact magnesium oxide target is not hot isostatic pressed,
   wherein said sintered compact magnesium oxide target for sputtering has a density of 3.58 g/cm$^3$ or higher;
   wherein a variation of a transparency of said target is within 1%.

2. The method for producing a sintered compact magnesium oxide target as in claim 1, wherein said sintered compact magnesium oxide target comprises a purity of 99.99 wt % or higher.

3. The method for producing a sintered compact magnesium oxide target as in claim 1, wherein said applied pressure is 300 kgf/cm$^2$ or more.

4. The method for producing a sintered compact magnesium oxide target as in claim 1, wherein said variation in said transparency is within 0.75%.

5. The method for producing a sintered compact magnesium oxide target as in claim 1, wherein said variation in said transparency is within 0.50%.

6. The method for producing a sintered compact magnesium oxide target as in claim 1, wherein said method does not include any additional sintering steps after said hot pressing in a uniaxial direction.

7. The method for producing a sintered compact magnesium oxide target as in claim 1, wherein said method does not use any electromelted powders.

8. A method for producing a sintered compact magnesium oxide target for sputtering, the method comprising:
   obtaining a raw material by the milling of magnesium oxide (MgO), wherein said raw material include powders comprising magnesium oxide (MgO) having a purity of 99.99 wt % or higher and an average grain size of 0.5 μm or less, said raw material being devoid of MgCO$_3$; and
   hot pressing said milled powder at a temperature greater than 1500° C. and less than or equal to 1700° C. and an applied pressure of at least 200 kgf/cm$^2$ or more in a uniaxial direction, to obtain a sintered compact magnesium oxide target, thereby said sintered compact magnesium oxide target is not hot isostatic pressed,
   wherein said sintered compact magnesium oxide target includes:
      a purity of 99.99 wt % or higher;
      a density of 3.58 g/cm$^3$ or higher;
      a variation of a transparency of said target is within 1%;
      a transparency of 10% or more; and
      an average crystal grain size of 50 μm or more.

9. The method for producing a sintered compact magnesium oxide target as in claim 8, wherein said variation in said transparency is within 0.75%.

10. The method for producing a sintered compact magnesium oxide target as in claim 8, wherein a variation in said transparency is within 0.50%.

11. The method for producing a sintered compact magnesium oxide target as in claim 8, wherein said method does not include any additional sintering steps after said hot pressing in a uniaxial direction.

12. The method for producing a sintered compact magnesium oxide target as in claim 8, wherein said method does not use any electromelted powders.

* * * * *